US011129021B2

(12) United States Patent
Henry et al.

(10) Patent No.: US 11,129,021 B2
(45) Date of Patent: Sep. 21, 2021

(54) NETWORK ACCESS CONTROL

(71) Applicant: Cisco Technology, Inc., San Jose, CA (US)

(72) Inventors: Jerome Henry, Pittsboro, NC (US); Damodar Banodkar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/190,887

(22) Filed: Mar. 3, 2021

(65) Prior Publication Data

US 2021/0195414 A1   Jun. 24, 2021

Related U.S. Application Data

(63) Continuation of application No. 17/098,677, filed on Nov. 16, 2020, which is a continuation of application
(Continued)

(51) Int. Cl.
*G06F 21/45* (2013.01)
*H04L 9/12* (2006.01)
(Continued)

(52) U.S. Cl.
CPC .......... *H04W 12/06* (2013.01); *H04L 9/0819* (2013.01); *H04L 9/14* (2013.01); *H04L 9/3218* (2013.01);
(Continued)

(58) Field of Classification Search
None
See application file for complete search history.

(56) References Cited

U.S. PATENT DOCUMENTS 6,823,454 B1   11/2004   Hind et al.
8,112,517 B2   2/2012   Takeshima et al.
(Continued)

OTHER PUBLICATIONS

An EAP-EHash authentication method adapted to resource constrained terminals. Cheikrouhou. Ann. Telecommun. (Year: 2010).*
(Continued)

*Primary Examiner* — Venkat Perungavoor
(74) *Attorney, Agent, or Firm* — Edell, Shapiro & Finnan, LLC

(57) ABSTRACT

A network controller configured to provide network access to client devices, receives a network access request from a client device. The network access request includes a media access control (MAC) address of the client device and information about a first private key. The network controller sends to a server an authentication request, which includes the MAC address of the client device. The network controller receives an authentication response from the server, which includes a second private key. The network controller determines whether the first private key is the same as the second private key. In response to determining that the first private key is different from the second private key, network access is denied to the client device, and in response to determining that the first private key is the same as the second private key, network access is granted to the client device.

31 Claims, 8 Drawing Sheets

Related U.S. Application Data

No. 15/982,476, filed on May 17, 2018, now Pat. No. 10,932,129.

(60) Provisional application No. 62/536,177, filed on Jul. 24, 2017.

(51) Int. Cl.

| | | |
|---|---|---|
| *H04L 9/08* | (2006.01) | |
| *H04W 12/06* | (2021.01) | |
| *H04L 29/12* | (2006.01) | |
| *H04L 29/06* | (2006.01) | |
| *H04W 12/08* | (2021.01) | |
| *H04L 9/14* | (2006.01) | |
| *H04L 9/32* | (2006.01) | |
| *H04W 12/069* | (2021.01) | |
| *G06F 21/33* | (2013.01) | |
| *H04L 29/08* | (2006.01) | |
| *H04W 12/04* | (2021.01) | |

(52) U.S. Cl.
CPC .......... *H04L 9/3271* (2013.01); *H04L 61/203* (2013.01); *H04L 63/0876* (2013.01); *H04W 12/069* (2021.01); *H04W 12/08* (2013.01); *H04L 61/6022* (2013.01); *H04L 63/0892* (2013.01); *H04L 67/104* (2013.01); *H04L 67/42* (2013.01); *H04L 2209/80* (2013.01); *H04W 12/04* (2013.01)

(56) References Cited

U.S. PATENT DOCUMENTS

| | | | |
|---|---|---|---|
| 8,452,956 | B1 | 5/2013 | Kersey et al. |
| 9,049,265 | B1 | 6/2015 | Greenfield et al. |
| 9,088,891 | B2 | 7/2015 | Belton et al. |
| 2004/0068653 | A1 | 4/2004 | Fascenda |
| 2005/0071129 | A1 | 3/2005 | Yeap et al. |
| 2007/0192832 | A1* | 8/2007 | Qi .......................... H04L 63/12 726/3 |
| 2007/0280481 | A1* | 12/2007 | Eastlake ............... H04L 9/0844 380/277 |
| 2008/0046732 | A1* | 2/2008 | Fu ........................ H04L 63/068 713/171 |
| 2008/0069105 | A1* | 3/2008 | Costa .................. H04L 63/0853 370/392 |
| 2008/0072047 | A1* | 3/2008 | Sarikaya ............. H04L 63/0869 713/171 |
| 2008/0072311 | A1 | 3/2008 | Mullick et al. |
| 2008/0077592 | A1 | 3/2008 | Brodie et al. |
| 2009/0092255 | A1 | 4/2009 | Jou et al. |
| 2012/0011360 | A1 | 1/2012 | Engels et al. |
| 2014/0068724 | A1 | 3/2014 | Jou et al. |
| 2014/0215066 | A1 | 7/2014 | Kamat |
| 2014/0244834 | A1 | 8/2014 | Guedalia et al. |
| 2014/0282902 | A1 | 9/2014 | Zou et al. |
| 2015/0095648 | A1 | 4/2015 | Nix |
| 2015/0271169 | A1 | 9/2015 | Seligson et al. |
| 2016/0087967 | A1* | 3/2016 | Pang ..................... H04W 76/11 726/6 |
| 2016/0219548 | A1* | 7/2016 | Lindheimer ......... H04W 48/08 |
| 2016/0226869 | A1 | 8/2016 | Vachiravel et al. |
| 2016/0262021 | A1* | 9/2016 | Lee ....................... H04W 12/06 |
| 2017/0134956 | A1 | 5/2017 | Radpour |
| 2017/0142064 | A1 | 5/2017 | Weis et al. |
| 2017/0214724 | A1 | 7/2017 | Kudo et al. |
| 2017/0339728 | A1* | 11/2017 | Lee ....................... H04W 12/06 |
| 2017/0346848 | A1* | 11/2017 | Smith ..................... H04L 63/06 |
| 2018/0020353 | A1* | 1/2018 | Bhandaru ............... H04L 63/10 |
| 2018/0082054 | A1 | 3/2018 | Khwaja et al. |
| 2018/0227752 | A1* | 8/2018 | Teyeb ................... H04W 48/08 |
| 2018/0357411 | A1 | 12/2018 | Krishnamurthy et al. |
| 2019/0140823 | A1 | 5/2019 | Xie et al. |

OTHER PUBLICATIONS

Wireless Network Token-Based Fast Authentication. Kbar. IEEE. (Year: 2009).*
CN 110087240A. English Translation. (Year: 2019).*
An Improved Mechanism for Four-Way Handshake Procedure in IEEE802.11i. Xiao. IEEE. (Year: 2010).*
A Multi-Key Encryption Scheme for the Next Generation Wireless Network. Hung. Jour, of Comp. (Year: 2008).*
White Paper, "WLAN Security: Simplifying Without Compromising—Striking a Balance Between Security and Cost/Convenience", Ruckus Wireless, Inc., www.ruckuswireless.com, 803-71272-001 rev 02, 2013, 9 pages.
DataSheet, "HiveOS", 2018 Aerohive Networks, 2018, 4 pages.
"8.5 Identity PSK Feature Deployment Guide", Revised Sep. 14, 2017, www.cisco.com, 25 pages.
Cisco, "Configuring IKE Pre-Shared Keys Using a Radius Server for the Cisco Secure VPN Client", Cisco, Document ID:5726, updated May 14, 2009, 6 pages.

* cited by examiner

NETWORK ACCESS CONTROL

CROSS REFERENCE TO RELATED APPLICATIONS

This application is a continuation of U.S. application Ser. No. 17/098,677, filed Nov. 16, 2020, which in turn claims priority to U.S. application Ser. No. 15/982,476, filed May 17, 2018, now U.S. Pat. No. 10,932,129, issued Feb. 23, 2021, which in turn claims priority to U.S. Provisional Application No. 62/536,177, filed Jul. 24, 2017. The entireties of these prior applications are incorporated herein by reference.

TECHNICAL FIELD

The present disclosure relates to managing access to a wireless network.

BACKGROUND

In wireless local area networks, such as networks that operate according to the IEEE 802.11/Wi-Fi® wireless local area network (WLAN) standard, there are three types of authentication mechanisms: Open (no authentication), Pre-Shared Key (PSK) (typically common to all users in the cell), and IEEE 802.1X (user/device-based authentication).

The advent of Internet of Thing (IoT) devices increases the threat surface exponentially. Using an Open model is increasingly seen as dangerous. Using PSK is similarly seen as only partially secure, as there is no control of individual devices once they are configured with the PSK.

Administrators cannot revoke access for lost or compromised devices without changing the key for all devices in the PSK scheme. In a network of potentially thousands or millions of IoT devices, such a change is not trivial. IEEE 802.1X is a better alternative, but IoT devices are constrained devices, and many of them do not support 802.1X methods. Further, because IoT devices are designed to limit their complexity and associated cost, it may be not desirable to incorporate the complex scheme of the IEEE 802.1X standard in an IoT device in the foreseeable future. Simple media access control (MAC) authentication is sometimes acceptable, but does not provide encryption for over-the-air traffic.

DESCRIPTION OF EXAMPLE EMBODIMENTS

Overview

Presented herein are techniques to return from a Remote Authentication Dial-In User Service (RADIUS) server or other similar server, a per-user, per-device or per-group Pre-Shared Key (PSK). While a wireless client uses a pre-shared key (PSK) for authentication, the infrastructure dynamically assigns devices to isolated groups based on multiple criteria, allowing groups with different PSKs to co-exist in the same cell. This dynamic PSK assignment allows for better management of client and PSK lifecycle, especially in IoT environments, where PSK and associated characteristics can be used to create conditional profiles for client existence and movements in the cell.

In one embodiment, a method is provided for a network controller to control access to network resources. The network controller is configured to provide network access to client devices and receives a network access request from a client device. The network access request includes a media access control (MAC) address of the client device and a proof of ownership of, or more generally, information about, a first private key, e.g., an encrypted string encrypted with the first private key, the first private key itself, etc. The network controller sends to a server an authentication request, which includes the MAC address of the client device. The server uses the MAC address to search a database and determine if there is a match. If there is a match, the server retrieves a second private key associated with the MAC address. The server generates and sends an authentication response back to the network controller. The network controller receives from the server the authentication response, which includes the second private key. The network controller determines whether the first private key is the same as the second private key. In response to determining that the first private key is different from the second private key, network access is denied to the client device, and in response to determining that the first private key is the same as the second private key, network access is granted to the client device.

EXAMPLE EMBODIMENTS

Presented herein are techniques for authenticating client devices to gain access to network resources. These techniques are easily scalable to different kinds of client devices including IoT devices and any electronic devices seeking network access. The solution presented herein is useful for per-user or per-device Pre-Shared Key (PSK) network access control, particularly configured for IoT use cases. However, this solution may be useful for any WLAN-based network access control, not just for IoT applications.

This solution builds on top of an Authentication, Authorization and Accounting (AAA) architecture and creates a differentiated PSK solution for each device while maintaining a centralized policy and PSK at a RADIUS or other similar server.

Figure 1:
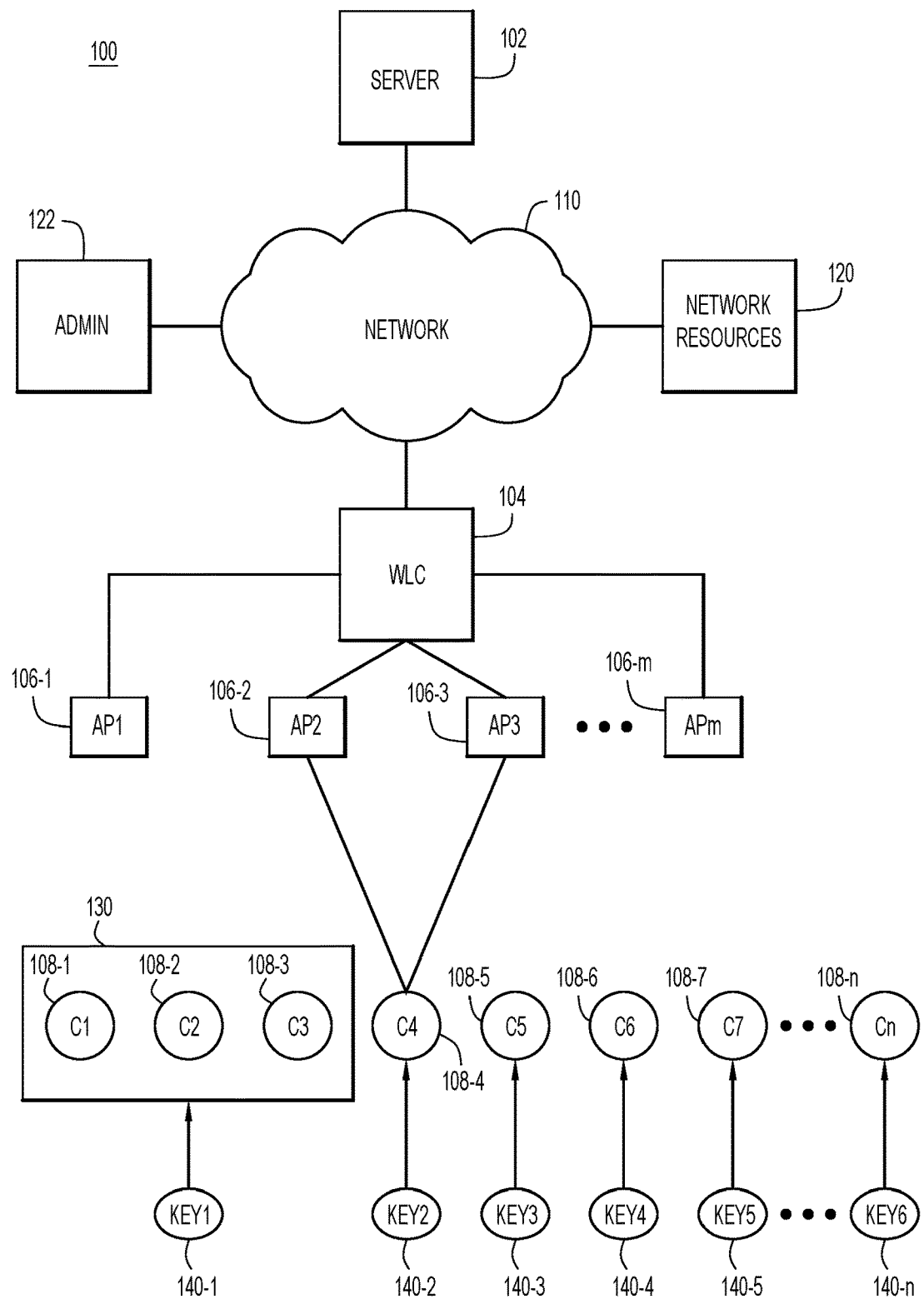
FIG. 1 depicts a network environment in which the network access control techniques presented herein may be employed, according to an example embodiment.

Reference is now made to FIG. 1 for a more detailed description of the above-described system and related methods. FIG. 1 depicts a network environment 100 according to an example embodiment. The environment 100 includes a server 102, a network controller 104, which may be a wireless LAN controller (WLC), a plurality of access points AP1-APm (labeled 106-1-106-*m*, or collectively as 106), and a plurality of client devices C1-Cn (labeled 108-1-108-*n*, or collectively as 108). It is to be understood that the number of the access points 106 or client devices 108 that can be included in the network environment 10 is not limited. The server 102 may be an AAA or RADIUS server that is configured to authenticate the identities of the client devices 108 and authorize eligible client devices to have a certain level of access to network resources. The network controller 104 is configured to receive network access requests from the client devices 108. The network controller 104 is further configured to generate authentication requests based on the network access requests and send them to the server 102 through network 110. After receiving authentication responses from the server 102, the network controller 104 is configured to communicate with a client device as to whether the client device is granted network access and, in some embodiment, also communicate any restrictions for the client device to access network resources.

Access points 106 are deployed as wireless connection points for the client devices 108 to access network resources 120. The network resources 120 may be hosted by one or more servers that provide various services, such as quality of service (QoS), virtual private network (VPN) connectivity, load balancing, voice over Internet Protocol (VOIP) communication, email, printing, domain name translation, or any other services now known or hereinafter developed. The network resources 120 may also include a network storage that hosts data or files.

Client devices 108 may be any electronic devices that need to access a network for various reasons. For example, client devices 108 may be IoT devices, lab devices, mobile phones, tablets, laptop computers, desktop computer, smart appliances, health monitors, tracking devices, medical devices, etc.

At the outset, each of the client devices 108 that needs to connect to the network 110 to gain access to network resources 120 registers with the server 102. A network administrator 122 can register each of the client devices 108 to the server 102. The registration records the respective MAC addresses and optionally the device types of the client devices 108. For example, an administrator may use a tablet, mobile phone, or a computer to log in the server 102 with a credential that allows the administrator to register a client device. The server 102 generates a private key for each MAC address. In some embodiments, the keys may come from a predetermined database that stores private keys that are generated by a machine or user. Other methods now known or hereinafter developed may be employed to generate the private keys. The server 102 returns, directly or indirectly, to each of the client devices 108 a key that will be used on the respective devices as a PSK. For example, the server 102 may send the keys to the administrator 122, which then provisions the keys to the client devices 108. In one embodiment, the server may send the keys to the client devices 108 via network 110. The keys are made available to the client devices 108 that register with the server 102. This key can be unique to a client device or be common to a group of client devices, such as a group of client devices based on device type. This key is called a "private key" in the workflow illustration below. As used herein, "private key" means that the key can be unique to a client device. In one embodiment, each client device has a different PSK. In another embodiment, clients can be grouped (for example by types, such as health monitors, lab devices, etc. or registered using the same user credential), and client devices in a group may share the same PSK. For example, referring to FIG. 1, client devices 108-1, 108-2, and 108-3 are assigned to a group 130 and client devices 108-1, 108-2, and 108-3 are assigned the same PSK.

After the server 102 generates private keys for the client devices 108, the server 102 stores a table that includes MAC addresses (and device types) of the client devices 108 and their corresponding private keys. The server 102 also returns the private key(s) to the administrator 122, who may then provision the private key(s) to corresponding client device (s). For example, the network administrator can manually configure the private key(s) on the client device(s) in, e.g., the PSK field of an IoT device WLAN configuration. Some IoT solutions allow for individual and manual provisioning of IoT devices through an input interface, while other solutions would distribute the key or the configuration through a file to a group of client devices that are to share the same private key. As shown in FIG. 1, Key1 (140-1) is provisioned to group 130 that includes client devices 108-1, 108-2, and 108-3. Similarly, the client devices 108-4 through 108-*n* are provisioned with private keys Key2 (140-2), Key3 (140-3), Key4 (140-4), Key5 (140-5), and Key6 (140-*n*), respectively.

To gain access to the network 110, each client device 108 sends an access request to the network controller 104 though one of the access points 106. The access request includes the MAC address and a proof of ownership of, or information about, a private key of the client device 108. In one embodiment, to prove ownership of a private key of the client device 108, an AP 106 may send a random string to the client device 108, which uses its private key to encrypt the random string. The client device 108 then sends the encrypted string with its MAC address to the network controller 104. In some embodiments, the client device 108 may send the private key itself with its MAC address to the network controller 104. For example, an IoT device needs to connect to a target service set identifier (SSID). During the initial association phase, the IoT device exposes its MAC address.

Once the network controller 104 receives the access request, it generates an authentication or access request that includes the MAC address of the client device but does not include the private key or information about the private key. The network controller 104 then sends the authentication request to the server 102. In the context of an IoT use case, a WLC, e.g., network controller 104, relays an authentication request to an AAA server, e.g., server 102. The IoT device's MAC address is used as a basic identification mechanism. In one embodiment, the MAC address is employed as the username and password in the authentication request. The MAC address is used by the server 102 as an identification or authentication value.

When the server 102 receives the authentication request from the network controller 104, the server 102 searches a database for an entry that includes the MAC address. If the server 102 is able to find an entry for the MAC address, the server 102 retrieves a private key associated with or assigned to the MAC address. The server 102 then generates an authentication response that includes the private key it found and returns the authentication response to the network controller 104. If the server 102 does not find an entry for the MAC address, the server 102 generates an authentication response that indicates to the network controller 104 to deny the network access request from the client device.

In some embodiments, upon finding the MAC address in its database, the server 102 returns a Success status, along with a Change of Authorization (CoA) message. The CoA message can include several vendor-specific attributes (e.g., as specified in IETF draft RFC 2865, type 26), but will also include the key (PSK) uniquely associated with the MAC address of the client device. This process is different from standard Extensible Authentication Protocol (EAP)/IEEE 802.1X authentication because in this solution, the 802.1X process is not operating between the end client and the RADIUS/AAA server. From the end client's perspective, the authentication is PSK authentication. Therefore, this mechanism dynamically associates a RADIUS authentication to a native PSK mechanism.

The network controller 104 then determines whether to give access to the client device to network 110 based on the authentication response from the server 102. In one embodiment, the network controller 104 determines if the authentication response includes any private key. If no private key is included in the authentication response, the network controller 104 determines that the client device is not allowed to access the network 110 and sends a deny or other similar notification message to the requesting client device. Failure to receive a private key in the authentication response or a failure message from the AAA server is indicative of a compromised or unauthorized client device. If the authentication response includes a private key, the network controller 104 determines whether the private key in the authentication response is the same as the private key indicated the access request received from the client device. For example, the network controller 104 may use the private key in the authentication response to encrypt the random string generated by the AP 106 and compare this encrypted string with the string received from the client device. If these two encrypted strings are the same, it indicates that the private key in the authentication response is the same as the private key in the access request received from the client device. In other embodiments, the network controller 104 can compare the private key in the authentication response with the private key in the access request received from the client device.

In response to determining that the private keys are different, the network controller 104 denies network access to the client device. On the other hand, if the private keys are the same, the network controller 104 grants network access to the client device. In some embodiments, after the network controller 104 receives the private key in the authentication response, the network controller 104 uses the received private key to initiate a four-way handshake with the client device.

In one embodiment, when the private keys are different, the private key of the client device is treated as a common PSK configured for all client devices 108 to have access to the network resources.

In one embodiment, once a client device is determined to be eligible for network access, the network controller 104 may grant the client device full access to the network 110. In other embodiments, the network controller 104 may grant the client device restricted access to the network 110 based on information in the authentication response or other policies. For example, a CoA message included in the authentication response may include several standard AAA override provisions, such as Virtual Local Area Network (VLAN) or Access Control Lists (ACLs). In another embodiment, the CoA message can also include other restricted parameters.

In one embodiment, a CoA message may require the network controller 104 to allow a client device to communicate with a single server. The network controller 104 may give to the client device static ACLs restricting its communications to one or a set of IP addresses and ports.

In another embodiment, the network controller 104 may send to the client device Dynamic Host Configuration Protocol (DHCP) server information (e.g., DHCP Option 150) about a specific server or servers to which the client device should connect. The CoA vendor-specific attributes may include a "watch" option that will mandate that the next packet from the client device should be to contact an expected server and port. This verification constitutes a second layer of authentication. Non-conforming clients will be flagged as compromised and blocked/blacklisted. In some embodiments, this second verification logic can be applied along with other restrictive measures imposed on the client device disclosed herein.

In one embodiment, a client device may be expected to obey a specific set of traffic patterns. For example, the client device is required to use a specific type of packet, or to send packets of a specific size range and/or at a specific interval. The CoA vendor-specific attributes may include a "watch" option that will mandate that the packets to and from the IoT device should match certain packet parameters or patterns.

In yet another embodiment, a client device may be required to operate in constrained paths. As such, its signal level, or roaming path, may be known. The CoA vendor-specific attributes may include a "watch" option that will mandate that the traffic from the client device should stay within a given signal range, and/or within a certain set of access points. For example, referring to FIG. 1, a "watch" option may require client device 108-4 to only communicate through AP2 and AP3. A typical application of such "watch" option is asset-tracking for IoT devices, especially in healthcare/retail applications. This solution defines the physical boundary of operation for a device. If a device is taken outside this physical boundary, the device will be quarantined to a secure partitioned network such as a virtual local area network (VLAN), and the administrator would be alerted. In some embodiments, the device is disconnected or blacklisted from accessing the network 110.

In some embodiments, the network controller 104 is configured to monitor network activities of a client device and determine whether the client device accesses a network resource other than a predetermined network resource, e.g., a "watch" option as described above. If the client device accesses a network resource other than the predetermined network resource, the network controller 104 may block the client device from further accessing the network 110.

In some embodiments, client devices may only talk to devices that belong to a single user account, e.g., same user identifier (ID). The CoA vendor-specific attributes may include a "watch" option that will allow peer-to-peer traffic only for devices with same user ID.

In one embodiment, when a group of client devices shares a same private key, a Multicast Domain Name Service (mDNS) group can be created where devices with the same Identity PSK (iPSK) create their own mDNS domain and can talk to each other.

In a non-IoT use case, the security mechanisms as described above can also be extended to enhance current non-encryption Web-Auth Guest Wi-Fi networks. In this embodiment, a guest logs into an on-boarding SSID and accepts the terms of the guest network. The terms define an iPSK for the device, and the length (connection time, active browsing time) and quality of the connection (Data Rate, Total Bandwidth, instantaneous bandwidth limitation, uniform resource locator (URL) or traffic filtering, etc.).

In some embodiments, a unique iPSK association to a device allows for easy rotation of the key at intervals without disrupting the traffic of all other devices in the network. By using a centralized method, the scale limitations of other solutions for per-device PSK access control is avoided/overcome. In some embodiments, if the network controller 104 fails to receive an authentication response from the server 102 within a predetermined period of time from the time that the authentication request is sent, the network controller 104 denies the access request from the client device.

Figure 2:
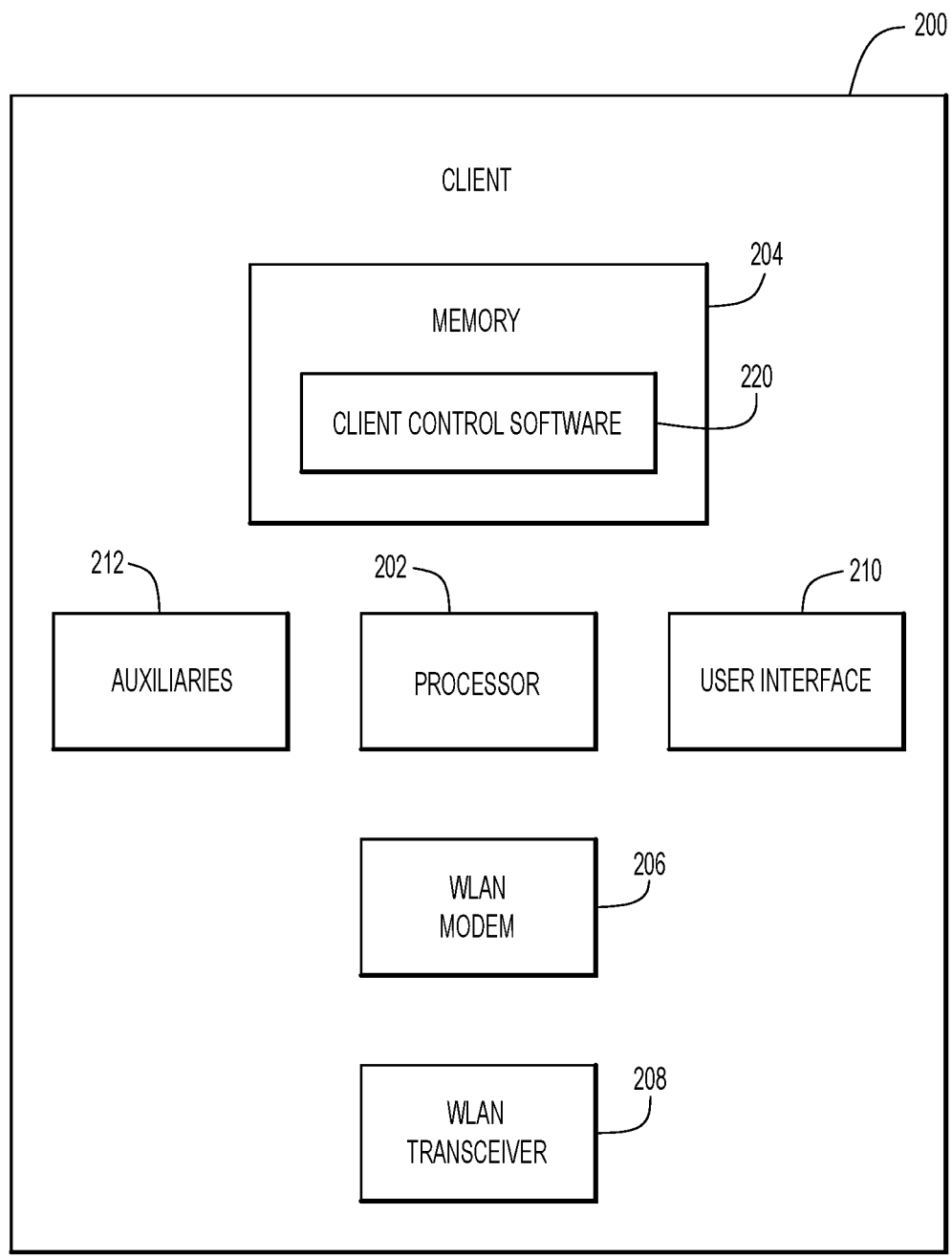
FIG. 2 depicts a block diagram of a client device configured to access a network using the network access control techniques presented herein, according to an example embodiment.

Reference is now made to FIG. 2. FIG. 2 depicts a block diagram of a client device 200 configured to participate in the processes described herein, according to an example embodiment. The client device 200 may be any one of the client devices C1-Cn as shown in FIG. 1. The client device 200 includes a processor 202, a memory 204, a WLAN modem 206, and a WLAN transceiver 208. The client device 200 may also include a user interface 210 and one or more auxiliaries 212 that allows the client device 200 to perform its specific function(s).

The processor 202 may be a microprocessor or microcontroller (or multiple instances of such components) that is configured to execute program logic instructions (i.e., software) for carrying out various operations and tasks described herein. For example, the processor 202 is configured to execute instructions for the client control software 220 stored in the memory 204. The processor 202 is configured to perform operations such as receiving and storing a private key for requesting access to network, generating and forwarding a network access request to a network controller for requesting access to a network, acting on a response to its access request, and other functions performed by the client device 200. Further descriptions of operations performed by the processor 202 when executing instructions stored in the memory 204 will be provided below.

The memory 204 may include read only memory (ROM), random access memory (RAM), magnetic disk storage media devices, optical storage media devices, flash memory devices, electrical, optical or other physical/tangible memory storage devices.

The functions of the processor 202 may be implemented by logic encoded in one or more tangible (non-transitory) computer-readable storage media (e.g., embedded logic such as an application specific integrated circuit, digital signal processor instructions, software that is executed by a processor, etc.), wherein the memory 204 stores data used for the operations described herein and stores software or processor executable instructions that are executed to carry out the operations described herein.

The client control software 220 may take any of a variety of forms, so as to be encoded in one or more tangible/non-transitory computer readable memory media or storage device for execution, such as fixed logic or programmable logic (e.g., software/computer instructions executed by a processor), and the processor 202 may be an application specific integrated circuit (ASIC) that comprises fixed digital logic, or a combination thereof.

For example, the processor 202 may be embodied by digital logic gates in a fixed or programmable digital logic integrated circuit, which digital logic gates are configured to execute the client control software 220. In general, the client control software 220 may be embodied in one or more computer-readable storage media encoded with software comprising computer executable instructions and when the software is executed operable to perform the operations described herein.

The WLAN modem 206 and WLAN transceiver 208 are configured to connect the client device 200 to a WLAN and to wirelessly communicate data, packets, and/or messages to and from the client device 200. The WLAN modem 206 and WLAN transceiver 208 may be configured to operate in accordance with any wireless communication protocol(s) now known or hereinafter developed, such as Wi-Fi/IEEE 802.11, or even a non-WLAN technology, such as Bluetooth®. The WLAN transceiver 208 and WLAN modem 206 may be part of a WLAN chipset that consists of one or more application specific integrated circuits configured to support a WLAN standard, such as the IEEE 802.11 standard.

The user interface 210 is coupled to the processor 202 and configured to allow a user to control the client device 200. The one or more auxiliaries 212 may be a speaker, a camera, a microphone, a display, a thermometer, light bulbs, heaters, health monitors/sensors, or any other specific functions the client device 200 is designed to perform. It is to be understood that there may be one or more additional processing ASICs connected between the auxiliaries 212 and the processor 202 to facilitate the respective functions of those components and interaction with the processor 202. Those processing ASICs are omitted in FIG. 2 for simplicity.

As explained above, the client device 200 may take the form of IoT devices, lab devices, mobile phones, tablets, laptop computers, desktop computers, smart appliances, health monitors, tracking devices, medical devices or any other electronic devices having computing and wireless network connectivity capabilities.

Figure 3:
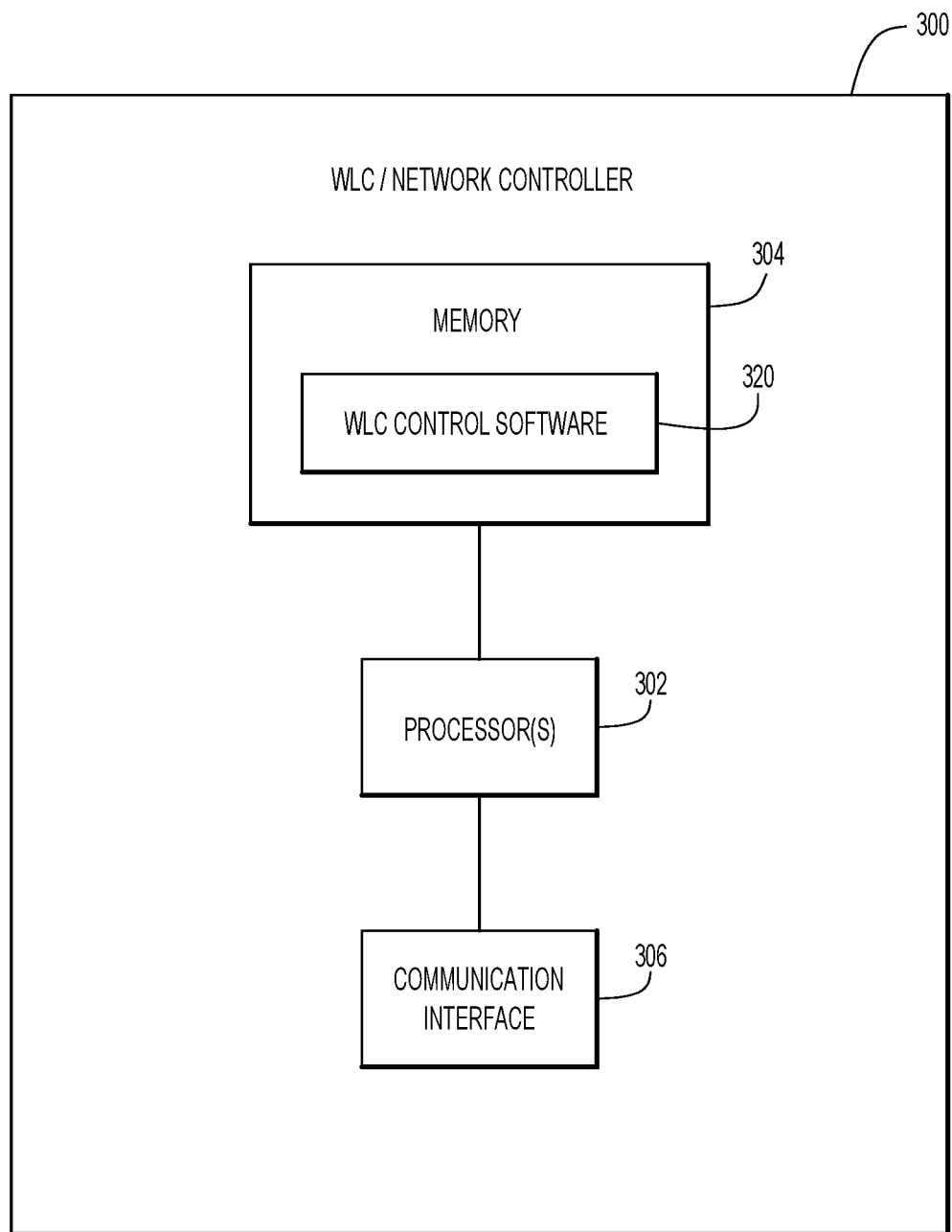
FIG. 3 depicts a block diagram of a network controller for controlling access permissions for client devices using the network access control techniques presented herein, according to an example embodiment.

FIG. 3 depicts a block diagram of an example network controller 300 according to an embodiment, such as the network controller 104 depicted in FIG. 1. As shown in FIG. 3, the network controller 300 includes a processor 302, a memory 304, and a communication interface 306. The processor 302 is a microprocessor or microcontroller that is configured to execute program logic instructions (i.e., software) for carrying out various operations and tasks described in this disclosure. For example, the processor 302 is configured to execute instructions for WLC control software 320 stored in the memory 304 to manage network access permissions for client devices 108. The processor 302 is configured to execute instructions for WLC control software 320 to perform operations including receiving network access requests from the client devices, generating and forwarding authentication requests to a server, receiving authentication responses from the server, and implementing access restrictions for the client devices. Further description of the operations performed by the processor 302 executing instructions stored in the memory 304 will be provided below.

The memory 304 may include ROM, RAM, magnetic disk storage media devices, optical storage media devices, flash memory devices, electrical, optical or other physical/tangible memory storage devices.

The functions of the processor 302 may be implemented by logic encoded in one or more tangible (non-transitory) computer-readable storage media (e.g., embedded logic such as an application specific integrated circuit, digital signal processor instructions, software that is executed by a processor, etc.), wherein the memory 304 stores data used for the operations described herein and stores software or processor executable instructions that are executed to carry out the operations described herein.

The WLC control software 320 may take any of a variety of forms, so as to be encoded in one or more tangible/non-transitory computer readable memory media or storage device for execution, such as fixed logic or programmable logic (e.g., software/computer instructions executed by a processor), and the processor 302 may be an ASIC that comprises fixed digital logic, or a combination thereof.

For example, the processor 302 may be embodied by digital logic gates in a fixed or programmable digital logic integrated circuit, which digital logic gates are configured to perform the WLC control software 320. In general, these logics may be embodied in one or more computer-readable storage media encoded with software comprising computer executable instructions and when the software is executed operable to perform the operations described herein.

The communication interface 306 is configured to transmit signals or receive signals for the network controller 300. The communication interface 306 may be one or more network interface cards for various communications with the client devices and servers.

Figure 4:
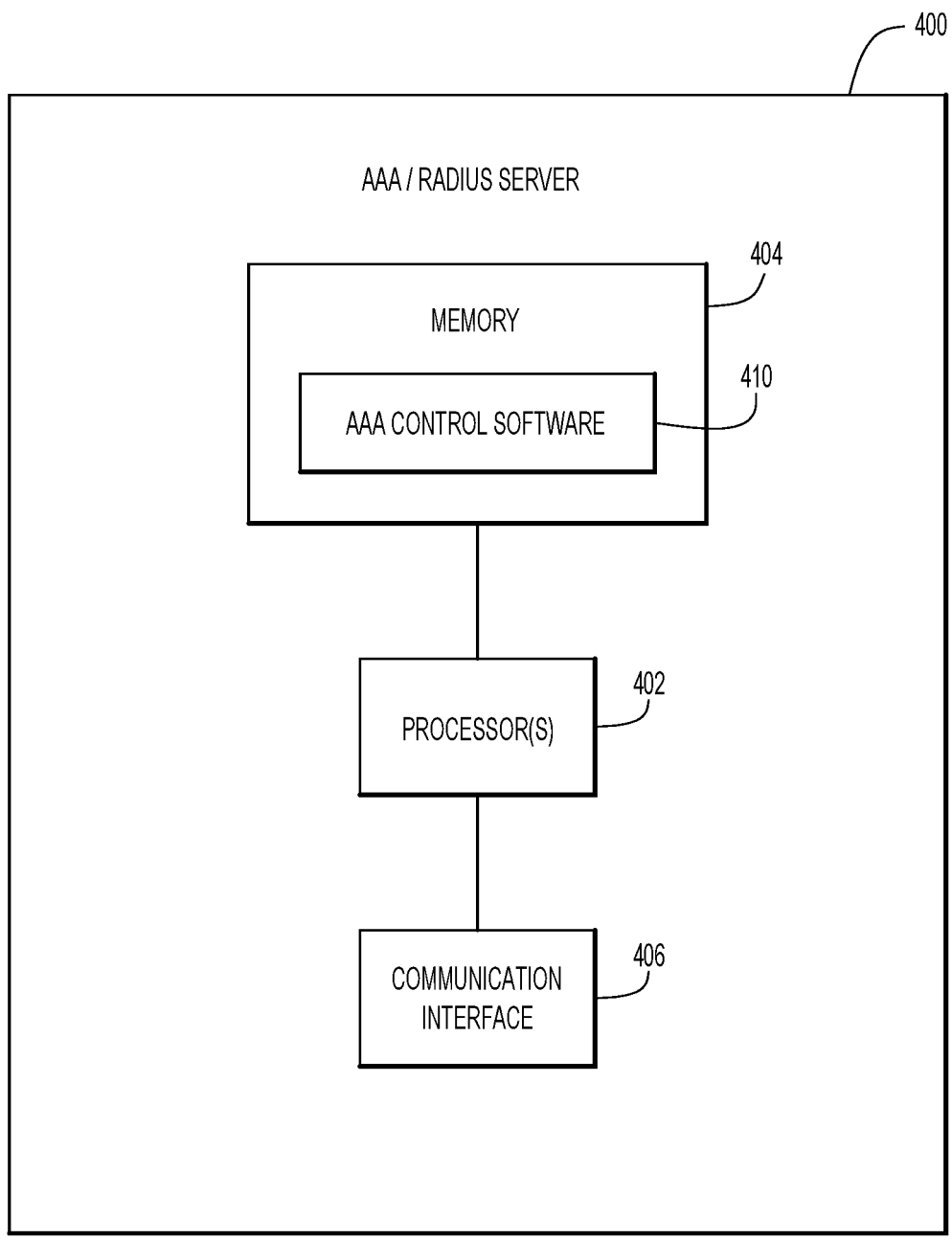
FIG. 4 depicts a block diagram of a server for authenticating client devices to gain access to a network, according to an example embodiment.

FIG. 4 depicts a block diagram of a server 400 for authenticating client devices for accessing network resources, according to an example embodiment. The server 400 may be the server 102 depicted in FIG. 1, which can be an AAA/RADIUS server. The server 400 includes a processor 402, a memory 404, and a communication interface 406. The processor 402 may be a microprocessor or microcontroller (or multiple instances of such components) that is configured to execute program logic instructions (i.e., software) for carrying out various operations and tasks described herein. For example, the processor 402 is configured to execute instructions stored in the memory 404 for AAA control software 410 to receive registration information of client devices, generate private keys for client devices for authentication and authorization purposes, receive authentication requests from network controllers, and generate authentication responses. Further descriptions of the operations performed by the processor 402 when executing instructions stored in the memory 404 are provided below.

The memory 404 may include ROM, RAM, magnetic disk storage media devices, optical storage media devices, flash memory devices, electrical, optical or other physical/tangible memory storage devices.

The functions of the processor 402 may be implemented by logic encoded in one or more tangible (non-transitory) computer-readable storage media (e.g., embedded logic such as an application specific integrated circuit, digital signal processor instructions, software that is executed by a processor, etc.), wherein the memory 404 stores data used for the operations described herein and stores software or processor executable instructions that are executed to carry out the operations described herein.

The AAA control software 410 may take any of a variety of forms, so as to be encoded in one or more tangible/non-transitory computer readable memory media or storage device for execution, such as fixed logic or programmable logic (e.g., software/computer instructions executed by a processor), and the processor 402 may be an ASIC that comprises fixed digital logic, or a combination thereof.

For example, the processor 402 may be embodied by digital logic gates in a fixed or programmable digital logic integrated circuit, which digital logic gates are configured to perform the AAA control software 410. In general, the AAA control software 410 may be embodied in one or more computer-readable storage media encoded with software comprising computer executable instructions and when the software is executed operable to perform the operations described herein. [ow] The communication interface 406 is configured to transmit communications to, and receive communications from, the network 110 for the server 400. In one example, the communication interface 406 may take the form of one or more network interface cards. For example, the communication interface 406 may receive registration information of client devices, communicate private keys to provision client devices, receive authentication requests from network controllers, and send authentication responses to network controllers.

Figure 5:
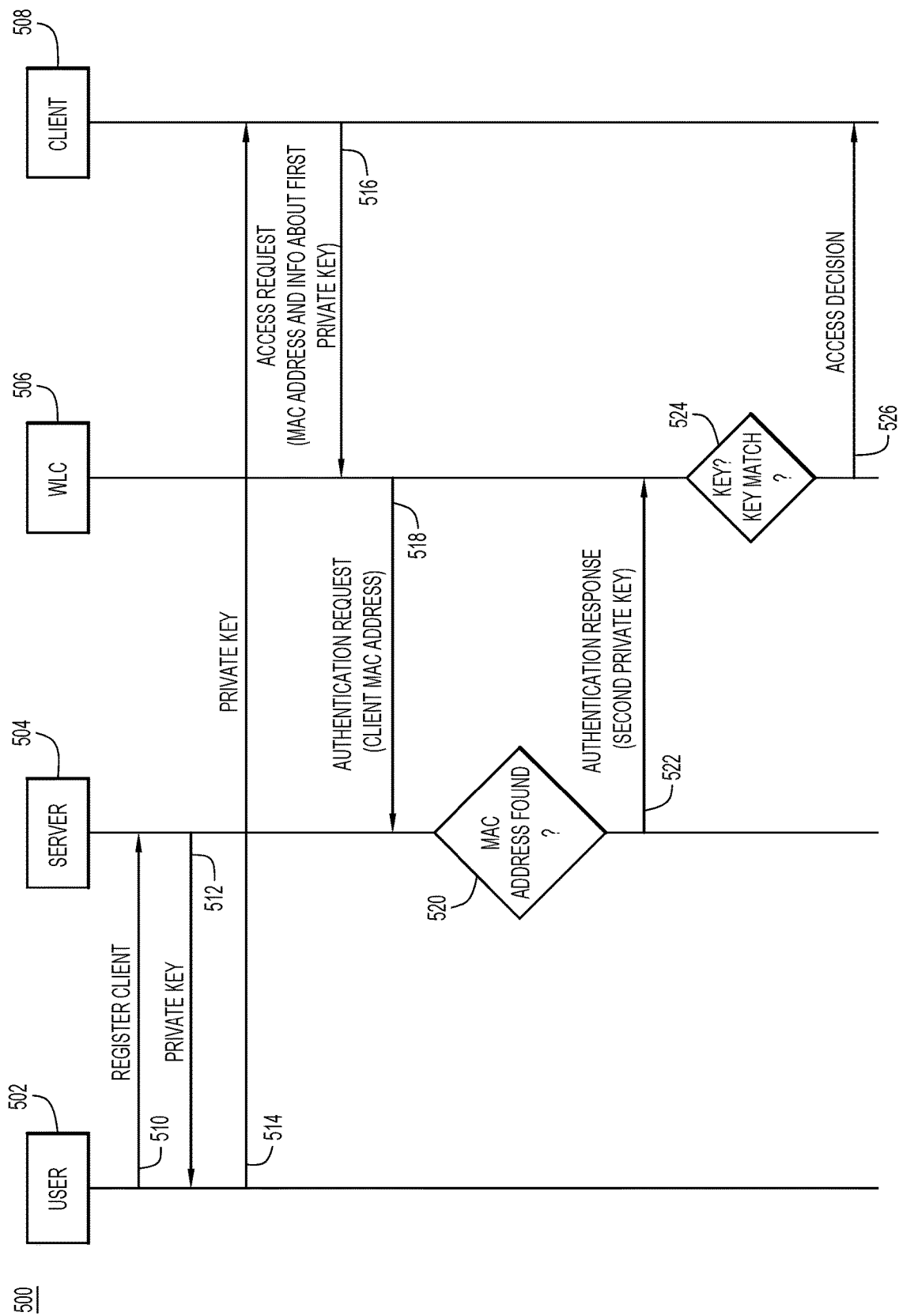
FIG. 5 is a sequence diagram illustrating a method for managing network access permissions, according to an example embodiment.

Reference will now be made to FIG. 5. With continuing reference to FIGS. 1-4, an example method for on-boarding client devices to a network is described. FIG. 5 is a sequence diagram illustrating a method 500 for managing network access permissions, according to an example embodiment. Although a single user 502, a single server 504, a WLC 506, and a single client device 508 are depicted in FIG. 5 for simplicity, it is to be understood that any number of these entities may be involved in the method.

At the outset, at 510 the user 502 employs a user device, e.g., a tablet or other mobile device, to register the client device 508 with the server 504 so that the client device 508 may have network access. In the registration process, the server 504 may request information about the client device 508. For example, the server 504 may request the user to provide the MAC address, the device type, and/or device capability of the client device 508. Once the server 504 receives the registration information, it generates a private key for the client device 508, and associates the generated private key with the MAC address of the client device 508. In some embodiments, the private key may be generated by another entity and provided by the server 504 for the client device 508. The server 504 also stores the client device information and the private key in its registry, such as a table stored in a memory.

At 512, the server 504 sends the private key to the user/user device 502. At 514, the private key is provisioned to the client device 508. For example, the private key may be entered by the user 502 via a user input interface on the client device 508. In one embodiment, the private key may be distributed to the client device 508 by a file.

At 516, the client device 508 sends to the WLC 506 a network access request. The network access request contains at least the MAC address of the client device 508 and a proof of ownership of, or information about, a private key (first private key). At this point, the client device 508 is involved in a PSK scheme to be authenticated and authorized to use the network as it sends the proof of ownership of or information about the pre-shared first private key to gain access to the network. For example, the proof of ownership of, or information about, the pre-shared first private key can be an encrypted string that is encrypted with the pre-shared first private key or other types of proof that show the client device 508 owns the pre-shared first private key. In one embodiment, the string is provided by an access point and encrypted by the client device 508 with the pre-shared first private key.

Upon receiving the access request from the client device 508, the WLC 506 generates an authentication request based on the access request to seek authentication by the server 504 of the client device 508. In one embodiment, the authentication request includes the MAC address of the client device 508 but does not include the information about the first private key received from the client device 508. For example, the MAC address included in the authentication request is used as an authentication value in an identification mechanism. At 518, the WLC 506 sends the authentication request to the server 504. In one embodiment, the WLC 506 may initiate a RADIUS Request with the MAC address as the username and password.

At 520, the server 504 uses the MAC address included in the authentication request to search its database. If the server 504 finds an entry of the MAC address, the server 504 retrieves a private key (second private key) associated with the MAC address and generates an authentication response that includes the second private key. It is to be noted that while the WLC 506 asks the server 504 to authenticate the client device 508 and does not ask for a key, the server 504 nonetheless includes a private key as part of the authentication response. If the server 520 does not find any entry in its stored table that matches the MAC address, the server 504 determines that the client device 508 is not authorized to access the network and in turn generates an authentication response indicating to the WLC 506 to that effect, e.g., by including no private key at all in the authentication response. At 522, the server 504 sends the authentication response to WLC 506.

Upon receiving the authentication response from the server 504, the WLC 506 determines whether the client device 508 is authorized to access the network. For example, at 524 if the authentication response does not include a private key, the WLC 506 determines that the client device 508 is not authorized to access the network. In one embodiment, if the authentication response includes a private key, the WLC 506 determines whether the private key received in the authentication response matches the private key received in the access request. For example, the WLC 506 uses the private key received in the authentication response to encrypt a string provided by an access point, which is also provided to the client device 508 as explained in connection with operation 516. The WLC 506 determines whether the encrypted string is the same as the string received from the client device 508 in the access request. If they are the same, the WLC 506 determines that the client device 508 is not compromised and is therefore authorized to access the network. If, however, the WLC 506 determines that private keys are different, the client device 508 may have been compromised and is not authorized to access the network. Based on these determinations, the WLC 506 generates an access decision. At 526, the WLC 506 informs the client device 508 with the access decision.

In some embodiments, when the access decision is to allow the client device 508 to have access to the network, the client device 508 may be required to follow some constrains. For example, the authentication response generated by the server 504 may include, in addition to the private key, a CoA message that imposes access restrictions on the client device. In one embodiment, the CoA message may include vendor-specific attributes that allow peer-to-peer traffic between the client device 508 and other client devices having a same user identification. In another embodiment, the CoA message includes access restriction parameters to restrict the network access to the client device 508 to one or more predetermined network resources. The WLC 506 is configured to monitor network activities of the client device 508 and determine whether the client device 508 accesses a network resource other than the predetermined network resource. If the WLC 506 determines that the client device 508 accesses a network resource other than the predetermined network resource, the WLC 506 is configured to block the client device 508 from accessing the network.

In one embodiment, the access restriction parameters require the client device 508 to obey a set of traffic patterns, such as using a specific type of packet and/or sending packets of a specific size range and/or at a specific interval. The access restriction parameters may require traffic from and to the client device 508 be with a predetermined set of access points.

In some embodiments, when the WLC 506 does not receive the authentication response from the server 504 with a predetermined period of time from a time it sends the authentication request to the server 504, the WLC 506 denies the access request.

Figure 6:
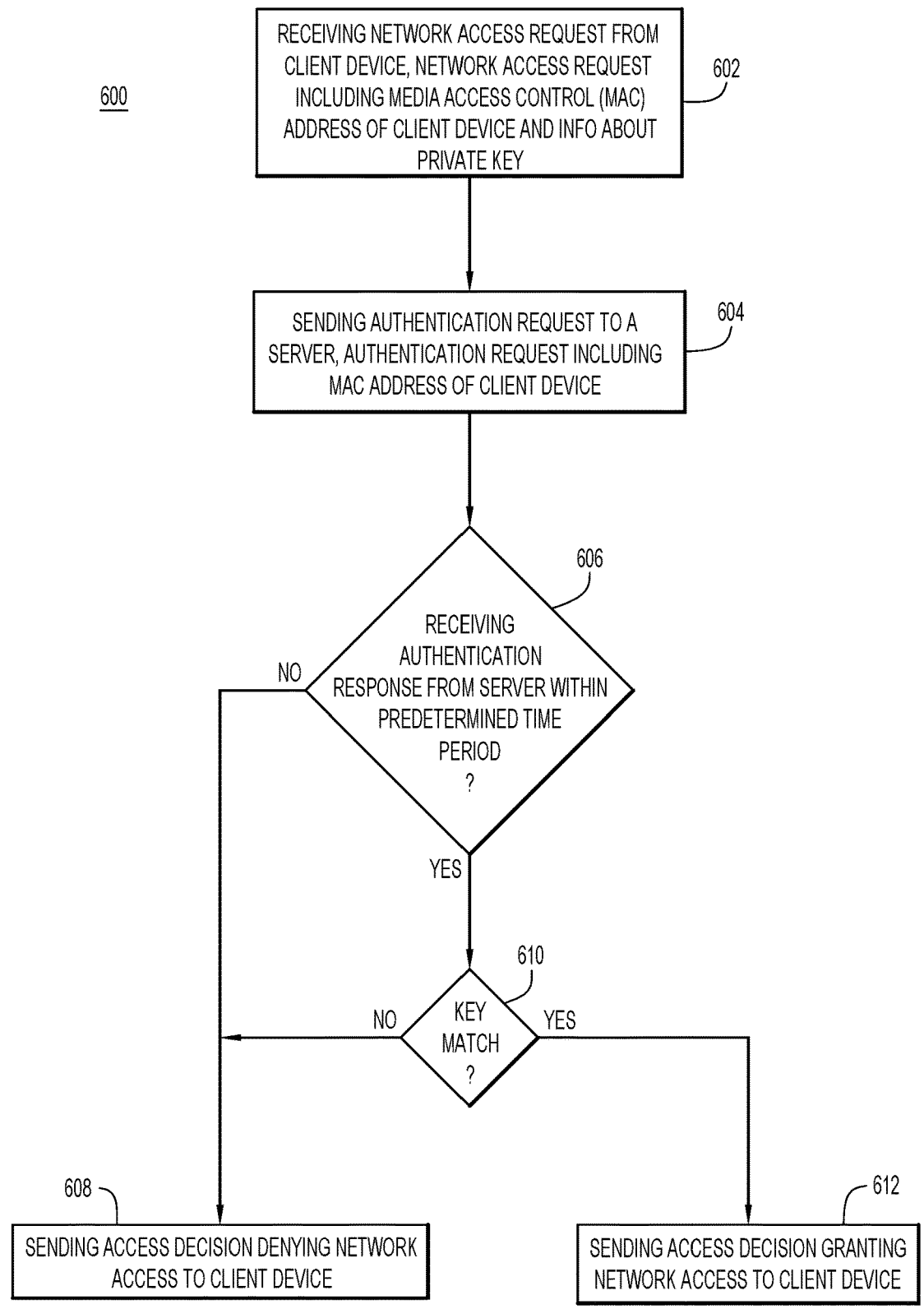
FIG. 6 is a flow chart of a method performed by the network controller for controlling network access permissions for client devices, according to an example embodiment.

FIG. 6 is a flow chart illustrating a method 600 performed by a network controller (e.g., WLC 104 shown in FIG. 1) for controlling network access permissions for client devices, according to an example embodiment. At 602, the network controller receives a network access request from a client device. The network access request includes a MAC address of the client device and a proof of ownership or information about a first private key. At 604, the network controller generates and sends an authentication request to an authentication server. The authentication request includes the MAC address of the client device and does not include proof of ownership or information about the first private key. At 606, the network controller determines whether an authentication request associated with the authentication request is received within a predetermined period of time. If no authentication request is received within the predetermined period of time (No at 606), at 608 the network controller sends to the requesting client device an access decision that denies network access to the client device. If the authentication request is received within the predetermined period of time (Yes at 606), at 610 the network controller determines whether a second private key included in the authentication response matches the first private key received from the client device. For example, the network controller determines that the second private key matches the first private key by determining whether a proof of ownership using the second private key is consistent with the proof of ownership received in operation 602. If the first private key does not match the second private (No at 610), at 608 the network controller sends to the requesting client device an access decision that denies network access to the client device. If the first private key matches the second private key (Yes at 610), at 612 the network controller sends to the requesting client device an access decision that grants network access to the client device. In some embodiments, when the client device is granted network access, the authentication server or the network controller may impose restrictions on the communications of the client device, as described above.

Figure 7:
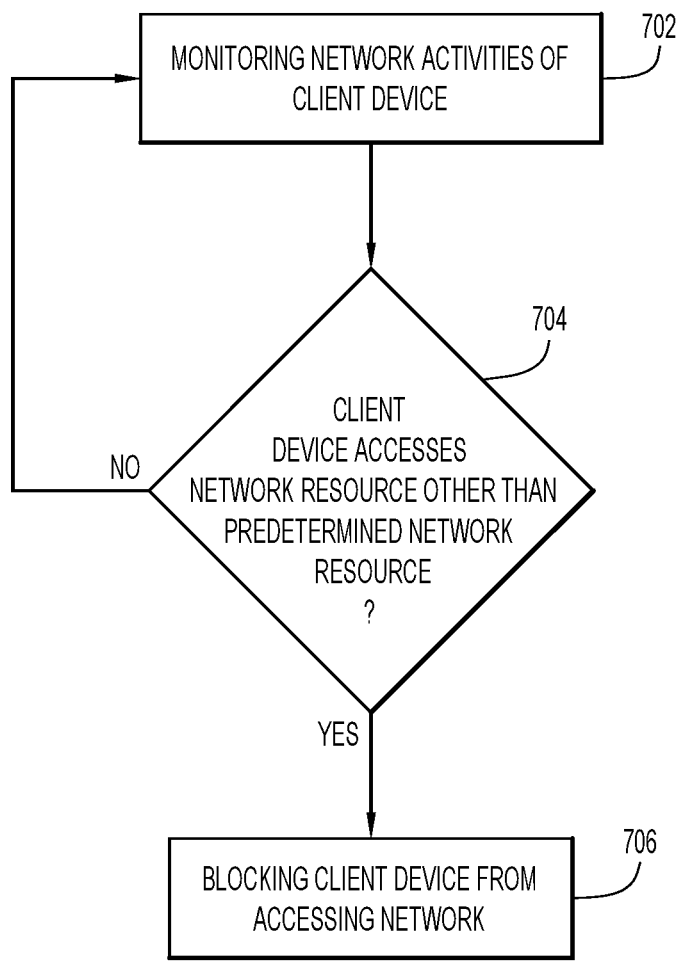
FIG. 7 is a flow chart of a method performed by the network controller for handling abnormal network activities, according to an example embodiment.

FIG. 7 is a flow chart illustrating a method 700 performed by a network controller (e.g., WLC 104 shown in FIG. 1) to handle abnormal network activities of client devices, according to an example embodiment. The network controller may restrict a client device to a predetermined network resource when granting network access to the client device. At 702, the network controller monitors the network activities of the client device. At 704, the network controller determines whether the client device accesses a network resource other than the predetermined network resource. If not, the method 700 returns to 702 where the network controller continues to monitor network activities of the client device. If the network controller determines that the client device accesses a network resource other than the predetermined network resource, at 706 the network controller blocks the client device from further accessing the network.

Figure 8:
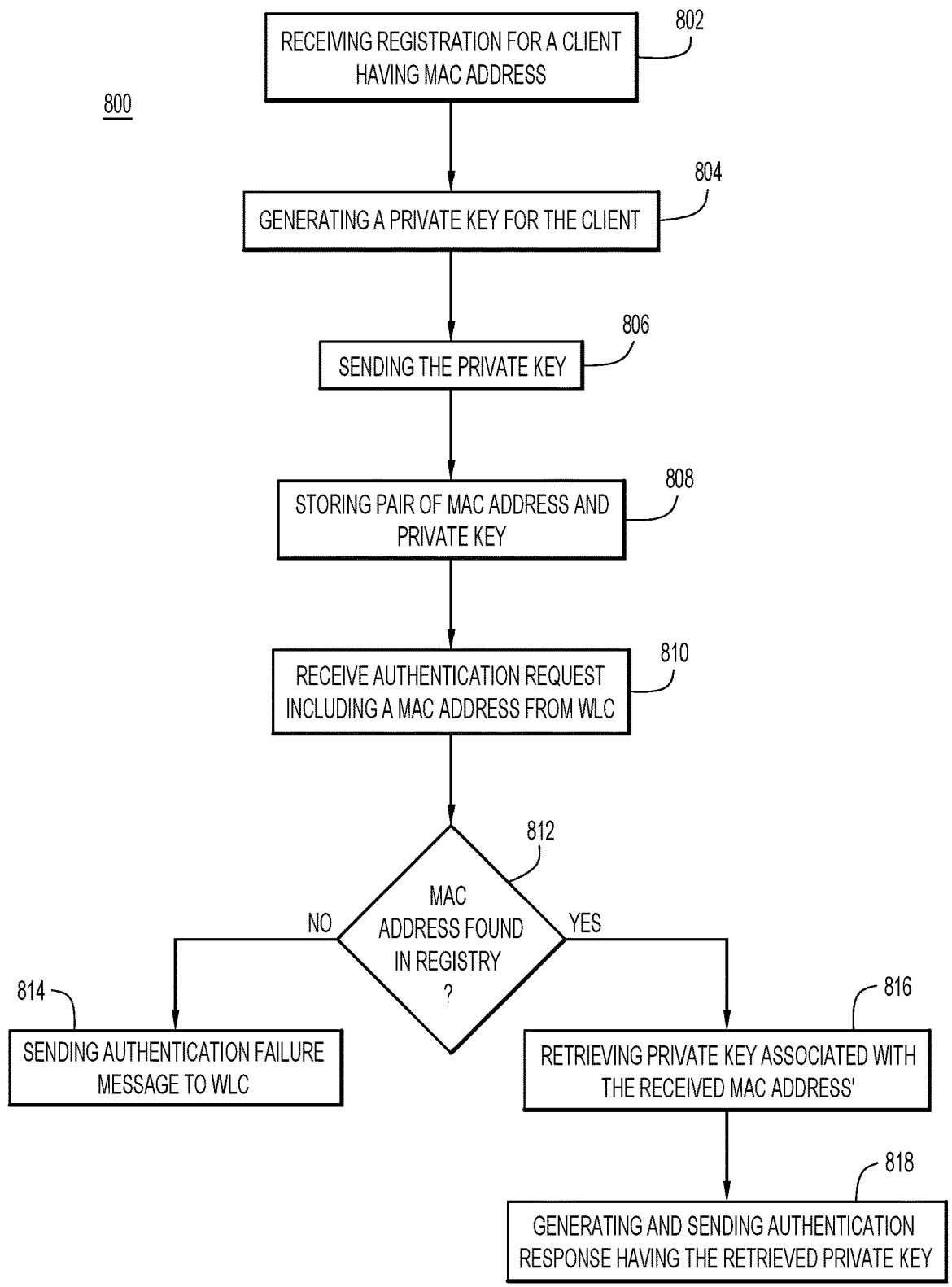
FIG. 8 is a flow chart of a method performed by an authentication server for authenticating client devices, according to an example embodiment.

FIG. 8 is a flow chart illustrating a method 800 performed by an AAA/RADIUS server (e.g., server 102 in FIG. 1) for authenticating client devices to gain access to a network, according to an example embodiment. At 802, the server receives registration information for a client device. For example, an administrator may employ a computing device to log into the server and enter information about the client device that is to be on-boarded to the network. The registration information about the client device includes the MAC address of the client device and may include other information, such as the type of the client device or the hardware or software capacities. At 804, the server generates a private key to correspond to the MAC address for the client device. At 806, the server sends the private key back to the administrator's computing device. At 808, the server saves in its registry (database) the MAC address and the corresponding private key. Other information about the client device may be saved in the entry at the same time. Operations 802-808 may be repeated whenever an administrator contacts the server to register one or more client devices.

At 810, the server receives from a WLC an authentication request that includes a MAC address of a client device. At 812, the server determines whether its registry includes an entry that matches the MAC address received at 810. If the server determines that its registry does not include an entry that matches the MAC address received at 810, at 814 the server sends an authentication failure message to the WLC. If the server determines that its registry does include an entry that matches the MAC address received at 810, at 816 the server retrieves a private key associated with the MAC address. At 818, the server generates and sends to the WLC an authentication response that includes the retrieved private key. In some embodiments, the authentication response may include a CoA message that includes vendor-specific attributes for imposing access restrictions to the client device.

It should be understood that the sequence presented in the methods explained above may be modified and is not limited to those disclosed herein.

To summarize, presented herein is a mechanism to return from a RADIUS server, a per-user, per-device or per-group PSK. While the wireless client uses PSK for authentication, the infrastructure may dynamically assign devices to isolated groups based on multiple criteria, allowing groups with different PSKs to co-exist in the same network cell. This dynamic PSK assignment allows for better management of client and PSK lifecycle, especially in IoT environments, where PSK and associated characteristics can be used to create conditional profiles for client existence and movements in the cell.

This mechanism combines the simplicity of PSK for the client configuration with the advantages of central key management and control of client traffic characteristics and client behavior. This solution is scalable, and offers a PSK mechanism with AAA, without the need to deploy a Public Key Infrastructure (PKI), and with the possibility of individual PSKs or identical PSKs for devices of the same type.

This solution allows for the use of a per-device PSK (which is useful when implementing IoT over Wi-Fi) while offering a central control mechanism. With the central AAA server, this solution scales well. By removing the need to onboard the device directly through a web page opened from the wireless client, and by using CoA to return additional constraints or parameters to the client, the present solution offers better network access control for IoT devices compared to solutions that mandate the existence of a web client on the client, which is impractical for IoT applications.

In summary, in one form, a method is disclosed. The method includes: at a network controller configured to provide network access to client devices, receiving a network access request from a client device, the network access request including a media access control (MAC) address of the client device and information about a first private key; sending, by the network controller, an authentication request to a server, wherein the authentication request includes the MAC address of the client device; receiving an authentication response from the server, the authentication response including a second private key; determining whether the first private key is the same as the second private key using the information about the first private key; in response to determining that the first private key is different from the second private key, denying network access to the client device; and in response to determining that the first private key is the same as the second private key, granting network access to the client device.

In another form, an apparatus is disclosed. The apparatus includes a network interface that enables network communications, a processor, and a memory to store data and instructions executable by the processor. The processor is configured to execute the instructions to: receive a network access request from a client device, the network access request including a media access control (MAC) address of the client device and information about a first private key; send an authentication request to a server, wherein the authentication request includes the MAC address of the client device; receive an authentication response from the server, the authentication response including a second private key; determine whether the first private key is the same as the second private key using the information about the first private key; in response to determining that the first private key is different from the second private key, deny network access to the client device; and in response to determining that the first private key is the same as the second private key, grant network access to the client device.

In yet another form, a non-transitory computer-readable storage media is disclosed. The media is encoded with software comprising computer executable instructions which, when executed by a processor, cause the processor to: receive a network access request from a client device, the network access request including a media access control (MAC) address of the client device and information about a first private key; send an authentication request to a server, wherein the authentication request includes the MAC address of the client device; receive an authentication response from the server, the authentication response including a second private key; determine whether the first private key is the same as the second private key using the information about the first private key; in response to determining that the first private key is different from the second private key, deny network access to the client device; and in response to determining that the first private key is the same as the second private key, grant network access to the client device.

The above description is intended by way of example only. The present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Although the techniques are illustrated and described herein as embodied in one or more specific examples, it is nevertheless not intended to be limited to the details shown, since various modifications and structural changes may be made within the scope and range of equivalents of this disclosure.

What is claimed is:

1. A method comprising:
   at a network device configured to provide network access to client devices, receiving a network access request from a client device, the network access request including a media access control (MAC) address of the client device;
   sending, by the network device, an authentication request to a server, wherein the authentication request includes the MAC address of the client device;
   receiving an authentication response from the server, the authentication response including a private key;
   initiating a four-way handshake with the client device using the private key returned by the server;
   in response to determining from the four-way handshake that the client device has not been configured with the private key, denying network access to the client device; and
   in response to determining from the four-way handshake that the client device has been configured with the private key, granting network access to the client device.

2. The method of claim 1, wherein the authentication response further includes vendor-specific attributes.

3. The method of claim 1, further comprising:
   registering the client device with the server, wherein the server generates the private key for the client device.

4. The method of claim 1, wherein the private key is unique to the client device.

5. The method of claim 1, wherein the private key is unique to a group of devices that includes the client device.

6. The method of claim 1, wherein the network access request received from the client device is an authentication request.

7. The method of claim 1, wherein the network device comprises a link layer network access controller.

8. The method of claim 1, wherein the network device comprises a wireless LAN controller.

9. The method of claim 1, further comprising denying network access to the client device if the authentication response does not include a private key.

10. The method of claim 1, wherein the authentication response includes access restriction parameters to restrict the network access to the client device to a predetermined network resource.

11. The method of claim 1, wherein the private key is a pre-shared key.

12. An apparatus comprising:
    a network interface that enables network communications;
    a processor; and
    a memory to store data and instructions executable by the processor, wherein the processor is configured to execute the instructions to:
      receive a network access request from a client device, the network access request including a media access control (MAC) address of the client device;
      send an authentication request to a server, wherein the authentication request includes the MAC address of the client device;
      receive an authentication response from the server, the authentication response including a private key;
      initiate a four-way handshake with the client device using the private key returned by the server;
      in response to determining from the four-way handshake that the client device has not been configured with the private key, deny network access to the client device; and
      in response to determining from the four-way handshake that the client device has been configured with the private key, grant network access to the client device.

13. The apparatus of claim 12, wherein the authentication response further includes vendor-specific attributes.

14. The apparatus of claim 12, wherein the processor is configured to execute the instructions to:
    register the client device with the server, wherein the server generates the private key for the client device.

15. The apparatus of claim 12, wherein the private key is unique to the client device.

16. The apparatus of claim 12, wherein the private key is unique to a group of devices that includes the client device.

17. The apparatus of claim 12, wherein the network access request received from the client device is an authentication request.

18. The apparatus of claim 12, wherein the apparatus comprises a link layer network access controller.

19. The apparatus of claim 12, wherein the apparatus comprises a wireless LAN controller.

20. The apparatus of claim 12, wherein the processor is configured to execute the instructions to:
    deny network access to the client device if the authentication response does not include a private key.

21. The apparatus of claim 12, wherein the authentication response includes access restriction parameters to restrict the network access to the client device to a predetermined network resource.

22. The apparatus of claim 12, wherein the private key is a pre-shared key.

23. A non-transitory computer-readable storage media encoded with software comprising computer executable instructions which, when executed by a processor, cause the processor to:
    receive a network access request from a client device, the network access request including a media access control (MAC) address of the client device;
    send an authentication request to a server, wherein the authentication request includes the MAC address of the client device;
    receive an authentication response from the server, the authentication response including a private key;
    initiate a four-way handshake with the client device using the private key returned by the server;
    in response to determining from initiation of the four-way handshake that the client device has not been configured with the private key, deny network access to the client device; and
    in response to determining from initiation of the four-way handshake that the client device has been configured with the private key, grant network access to the client device.

24. The non-transitory computer-readable storage media of claim 23, wherein the authentication response further includes vendor-specific attributes.

25. The non-transitory computer-readable storage media of claim 23, wherein the instructions further cause the processor to:
    register the client device with the server, wherein the server generates the private key for the client device.

26. The non-transitory computer-readable storage media of claim 23 wherein the private key is unique to the client device.

27. The non-transitory computer-readable storage media of claim 23 wherein the private key is unique to a group of devices that includes the client device.

28. The non-transitory computer-readable storage media of claim 23, wherein the network access request received from the client device is an authentication request.

29. The non-transitory computer-readable storage media of claim 23, wherein the instructions further cause the processor to:
  deny network access to the client device if the authentication response does not include a private key.

30. The non-transitory computer-readable storage media of claim 23, wherein the authentication response includes access restriction parameters to restrict the network access to the client device to a predetermined network resource.

31. The non-transitory computer-readable storage media of claim 23, wherein the private key is a pre-shared key.

* * * * *